H. SANDERS.
BARREL-TAPS.
No. 187,179.  Patented Feb. 6, 1877.
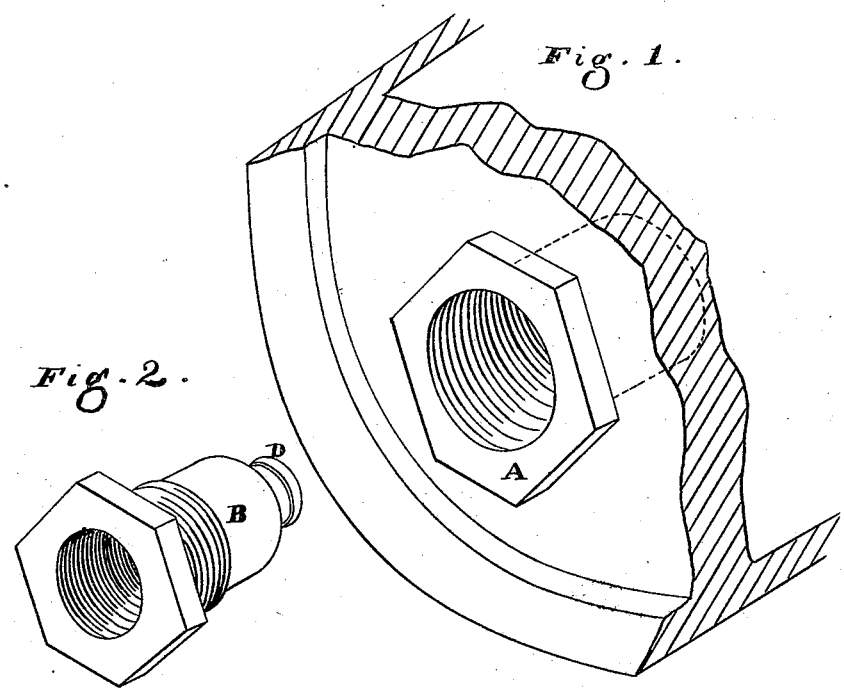
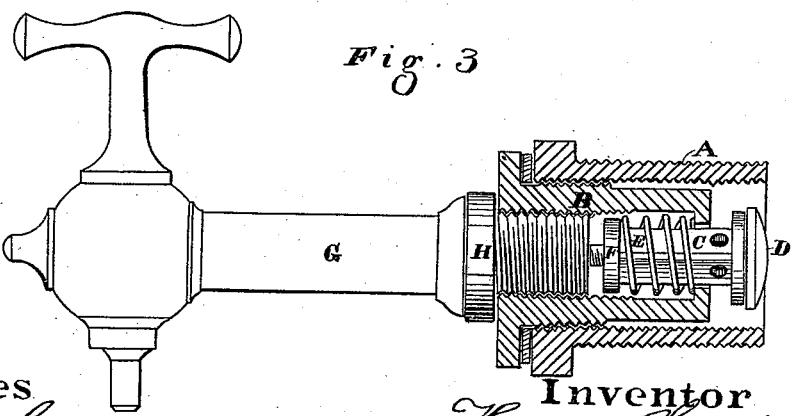
Witnesses
Geo. H. Strong
Dwyer T. Stacy
Inventor
Henry Sanders
By his Atty,
Dewey & Co.

UNITED STATES PATENT OFFICE.

HENRY SANDERS, OF SAN FRANCISCO, CALIFORNIA.

IMPROVEMENT IN BARREL-TAPS.

Specification forming part of Letters Patent No. 187,179, dated February 6, 1877; application filed December 2, 1876.

*To all whom it may concern:*

Be it known that I, HENRY SANDERS, of the city and county of San Francisco and State of California, have invented an Improved Barrel-Tap; and I do hereby declare the following to be a full, clear, and exact description thereof, reference being had to the accompanying drawings.

My invention relates to certain improvements in that class of barrel-taps which are fixed in the barrel and provided with a valve which is opened upon the introduction of the faucet, so that by the use of the faucet the contained liquid may be drawn at will.

My invention consists in the employment of a double tap, consisting of an outer gland which is screwed permanently into the cask, and an inner one which contains the valve and receives the faucet, said inner gland being removable from the outer one so as to allow free access to the cask for cleaning without interfering with the valve, or removing the gland which screws into the cask, which would in a short time cause it to leak. It also consists in a novel construction and arrangement of the valve, the whole being more fully described in the accompanying drawings, in which—

A is a bushing or gland, which is made of considerable size, and is provided with screw-threads both inside and outside. By means of the outside screw the gland is screwed into the aperture in the cask, and is not again removed. By thus leaving the gland permanently in place the screw-thread in the wood will not be broken or worn out, so as to cause it to leak, as is the case where these glands or bushings must be removed. It is, however, necessary to have a clear opening at this point at times, in order to cleanse the cask, and for this reason I employ a gland, B, having an interior screw-thread, which receives the faucet proper G, and this gland, containing the valve and connection, can be removed and replaced at any time without endangering the cask. The end of the gland which projects into the cask has a hole made in it somewhat smaller than the diameter of the interior of the gland, and through this the valve-spindle C projects, having the valve D, with a suitable elastic washer upon its outer end. This valve is seated upon the end of the gland, and is retained in place by spiral spring E, which surrounds the spindle C inside of the gland, pressing against a suitable interior head, F, as shown, and against the interior of the gland.

The valve-spindle is made triangular, so that its angles serve as a guide through the seat, while the space around the sides allows the liquid to pass when the valve is opened. Holes are also made through the sides of the valve to its interior, so that an additional passage is made for the flow of the liquid.

When it is desired to tap the cask the faucet G is screwed into the gland B, and by its pressure forces back the valve D from its seat, thus opening it.

In order to prevent leakage around the faucet, I employ a thick rubber washer, H, which becomes seated upon the outer end of the gland B before the valve commences to open, and the further screwing in of the faucet only compresses this washer and makes a tighter joint.

Having thus described my invention, what I claim as new, and desire to secure by Letters Patent, is—

In combination with the double glands A B, the valve D, seating upon the inner end of the gland B, and provided with the triangular guiding-spindle C, and holding-spring E, said spindle being perforated with holes near the valve and opening into an interior longitudinal passage, substantially as and for the purpose described.

In witness whereof I have hereunto set my hand and seal.

HENRY SANDERS. [L. S.]

Witnesses:
OLWYN T. STACY,
FRANK A. BROOKS.